United States Patent
Matsubara (10) Patent No.: US 8,451,428 B2
(45) Date of Patent: May 28, 2013

(54) COMPUTER GENERATED HOLOGRAM, EXPOSURE APPARATUS AND DEVICE FABRICATION METHOD

(75) Inventor: Isao Matsubara, Tucson, AZ (US)

(73) Assignee: Canon Kabushiki Kaisha (JP)

( * ) Notice: Subject to any disclaimer, the term of this patent is extended or adjusted under 35 U.S.C. 154(b) by 350 days.

(21) Appl. No.: 13/003,829

(22) PCT Filed: Jul. 17, 2009

(86) PCT No.: PCT/JP2009/063303
§ 371 (c)(1),
(2), (4) Date: Jan. 12, 2011

(87) PCT Pub. No.: WO2010/024075
PCT Pub. Date: Mar. 4, 2010

(65) Prior Publication Data
US 2011/0116069 A1    May 19, 2011

(30) Foreign Application Priority Data
Aug. 27, 2008   (JP) .................................. 2008-218823

(51) Int. Cl.
*G03B 27/54* (2006.01)
*G02B 5/32* (2006.01)

(52) U.S. Cl.
USPC ............................................. 355/67; 359/15

(58) Field of Classification Search
USPC .................... 355/2, 53, 67; 359/9, 15
See application file for complete search history.

(56) References Cited

U.S. PATENT DOCUMENTS

| | | |
|---|---|---|
| 7,196,773 B2 | 3/2007 | Suzuki |
| 7,265,816 B2 | 9/2007 | Tsuji |
| 2005/0280794 A1 | 12/2005 | Tsuji |
| 2006/0012769 A1 | 1/2006 | Suzuki |
| 2006/0028957 A1 | 2/2006 | Kim |
| 2009/0034036 A1* | 2/2009 | Matsubara ........................ 359/9 |

FOREIGN PATENT DOCUMENTS

| | | |
|---|---|---|
| JP | 2003-315522 A | 11/2003 |
| JP | 2005-093522 A | 4/2005 |
| JP | 2006-005319 A | 1/2006 |
| JP | 2006-049902 A | 2/2006 |

(Continued)

OTHER PUBLICATIONS

International Search Report and Written Opinion issued in related PCT/JP2009/063303 mailed Oct. 10, 2009.

(Continued)

*Primary Examiner* — Hung Henry Nguyen
(74) *Attorney, Agent, or Firm* — Rossi, Kimms & McDowell LLP (57) ABSTRACT

The present invention provides a computer generated hologram including a plurality of anisotropic cells having different refractive indices with respect to linearly polarized light in a first direction and linearly polarized light in a second direction perpendicular to the linearly polarized light in the first direction, wherein the plurality of anisotropic cells are made of an identical material and includes a first anisotropic cell, a second anisotropic cell, a third anisotropic cell, and a fourth anisotropic cell which have different thicknesses, and the plurality of anisotropic cells change phases of linearly polarized light in the first direction and linearly polarized light in the second direction, thereby making a first light intensity distribution formed on a predetermined plane by the linearly polarized light in the first direction different from a second light intensity distribution formed on the predetermined plane by the linearly polarized light in the second direction.

8 Claims, 8 Drawing Sheets

FOREIGN PATENT DOCUMENTS

| | | |
|---|---|---|
| JP | 2006-196715 A | 7/2006 |
| JP | 2008-170679 A | 7/2008 |
| JP | 2009-036916 A | 2/2009 |
| JP | 2009-162939 A | 7/2009 |
| JP | 2009-164297 A | 7/2009 |

OTHER PUBLICATIONS

Xu, Fang, et al. "Polarization-selective computer-generated holograms: design, fabrication, and applications" Applied Optics, vol. 34, No. 2, Jan. 10, 1995, Washington D.C.

* cited by examiner

COMPUTER GENERATED HOLOGRAM, EXPOSURE APPARATUS AND DEVICE FABRICATION METHOD

This application is a U.S. National Phase Application of PCT International Application PCT/JP2009/063303 filed on Jul. 17, 2009 which is based on and claims priority from JP 2008-218823 filed on Aug. 27, 2008 the contents of which are incorporated herein by reference in their entirety.

TECHNICAL FIELD

The present invention relates to a computer generated hologram, an exposure apparatus and a device fabrication method.

BACKGROUND ART

A projection exposure apparatus has conventionally been employed to fabricate a micropatterned semiconductor device such as a semiconductor memory or logic circuit by using photolithography (printing). The projection exposure apparatus projects and transfers a circuit pattern formed on a reticle (mask) onto a substrate such as a wafer via a projection optical system.

The resolution R of the projection exposure apparatus is given by:

$$R = k_1 \times \frac{\lambda}{NA} \quad (1)$$

where $\lambda$ is the exposure light wavelength, NA is the numerical aperture of the projection optical system, and $k_1$ is a process constant determined by, e.g., a development process.

The shorter the exposure light wavelength or the higher the NA of the projection optical system, the better the resolution. However, it is difficult to further shorten the current exposure light wavelength because the transmittance of a general glass material decreases as the exposure light wavelength shortens. It is also difficult to further increase the NA of the projection optical system available at present because the depth of focus decreases in inverse proportion to the second power of the NA of the projection optical system, and because it is hard to design and manufacture lenses to form a high-NA projection optical system.

Under the circumstances, there have been proposed resolution enhanced technologies (RETs) of improving the resolution by decreasing the process constant $k_1$. One of these RETs is the so-called modified illumination method (or oblique illumination method).

The modified illumination method generally inserts an aperture stop, which has a light-shielding plate on the optical axis of an optical system, in the vicinity of the exit surface of an optical integrator which forms a uniform surface light source, thereby obliquely irradiating a reticle with exposure light. The modified illumination method includes, for example, an annular illumination method and quadrupole illumination method that are different in the aperture shape of an aperture stop (i.e., the shape of the light intensity distribution). There has also been proposed another modified illumination method which uses a computer generated hologram (CGH) in place of an aperture stop, in order to improve the use efficiency (illumination efficiency) of the exposure light.

Along with an increase in the NA of the projection optical system, a polarized illumination method which controls the polarization state of exposure light is also becoming necessary to increase the resolution of the projection exposure apparatus. The polarized illumination method basically illuminates a reticle with not P-polarized light but S-polarized light alone, which has a component in the circumferential direction of concentric circles about the optical axis.

In recent years, there has been proposed a technique which exploits both the modified illumination method (the formation of a light intensity distribution having a desired shape (for example, a quadrupolar shape)) and the polarized illumination method (polarization state control).

For example, Japanese Patent Laid-Open No. 2006-196715 discloses a technique which implements both the modified illumination method and polarized illumination method using one element. Japanese Patent Laid-Open No. 2006-196715 controls the shape (reproduced image) of the light intensity distribution using a CGH, and controls the polarization state using form birefringence. More specifically, this technique forms one CGH by parallelly arranging a plurality of CGHs (to be referred to as "sub-CGHs" hereinafter) corresponding to light beams in the same polarization direction, and applies form birefringence corresponding to the polarization direction to each sub-CGH.

Japanese Patent Laid-Open No. 2006-49902 selectively uses a desired polarization mode by adopting a polarization controller as a unit for controlling polarization modes applied to a sub-CGH.

Japanese Patent Laid-Open No. 2006-5319 discloses a technique which can control the balance among four poles of a quadrupole light intensity distribution typically formed by the modified illumination method and polarized illumination method. More specifically, Japanese Patent Laid-Open No. 2006-5319 forms sub-CGHs by dividing a CGH into four, and changes the intensity distribution of the incident light, thereby making it possible to change the pole balance of the reproduced image obtained by the CGH.

However, the prior arts form sub-CGHs by dividing one CGH into a plurality of CGHs, so an illuminance variation occurs in the reproduced image if the optical integrator cannot sufficiently correct the intensity distribution of the incident light (for example, if the light impinges on only some of these CGHs).

When a plurality of sub-CGHs are combined, unnecessary diffracted light is generated due to structural discontinuity that occurs at the boundary between the sub-CGHs, resulting in deterioration in the reproduced image obtained by the CGH. The structural discontinuity that occurs at the boundary between the sub-CGHs can be eliminated by improving the design of a computer generated hologram, but this poses another problem that the design cost increases enormously.

When the polarization modes are selectively used by the polarization controller, the use efficiency (illumination efficiency) of the light (exposure light) from the exposure light source decreases significantly (i.e., a loss in light amount increases).

To exploit both the modified illumination method and the polarized illumination method at once, it is possible to form a CGH by a combination of two types of media: an isotropic medium and an anisotropic medium. However, a CGH formed by two types of media is more difficult to manufacture than a conventional CGH formed by one type of medium (a CGH which does not control polarization). Therefore, the manufacturers bear a heavier burden of technical sophistication in manufacturing the former CGH than the latter CGH. In other words, a CGH is preferably formed by one type of medium from the viewpoint of ease of manufacture.

DISCLOSURE OF INVENTION

The present invention provides a computer generated hologram which can suppress an illuminance variation and a loss in light amount and form a light intensity distribution (reproduced image) with a predetermined shape and polarization state, and yet is advantageous in ease of manufacture.

According to one aspect of the present invention, there is provided a computer generated hologram which forms a light intensity distribution on a predetermined plane, the hologram including a plurality of anisotropic cells having different refractive indices with respect to linearly polarized light in a first direction and linearly polarized light in a second direction perpendicular to the linearly polarized light in the first direction, wherein the plurality of anisotropic cells are made of an identical material and includes a first anisotropic cell, a second anisotropic cell, a third anisotropic cell, and a fourth anisotropic cell which have different thicknesses, the plurality of anisotropic cells change phases of linearly polarized light in the first direction and linearly polarized light in the second direction, which are included in incident light on the plurality of anisotropic cells, thereby making a first light intensity distribution formed on the predetermined plane by the linearly polarized light in the first direction included in the incident light different from a second light intensity distribution formed on the predetermined plane by the linearly polarized light in the second direction included in the incident light, the second anisotropic cell has a thickness larger than a thickness of the first anisotropic cell by $\alpha$, the fourth anisotropic cell has a thickness larger than a thickness of the third anisotropic cell by $\alpha$, the third anisotropic cell has the thickness larger than the thickness of the first anisotropic cell by $\beta$, and the plurality of anisotropic cells satisfy: $0.75 \times (\lambda/N)/\{(n_1+n_2)/2-n_a\} < \alpha < 1.25 \times (\lambda/N)/\{(n_1+n_2)/2-n_a\}$, $0.75 \times (\lambda/N)/|n_1-n_2| < \beta < 1.25 \times (\lambda/N)/|n_1-n_2|$, and $i \times N/2 + 0.25 < \beta/\alpha < i \times N/2 + 0.75$, where $\lambda$ is a wavelength of the incident light on the plurality of anisotropic cells; $n_1$ is the refractive index of the plurality of anisotropic cells with respect to the linearly polarized light in the first direction; $n_2$ is the refractive index of the plurality of anisotropic cells with respect to the linearly polarized light in the second direction; $n_a$ is a refractive index of an atmosphere; N is the number of phase levels of a phase distribution according to which the phases of the linearly polarized light in the first direction and the linearly polarized light in the second direction, which are included in the incident light, are changed; and i is an integer not less than 2.

Further aspects of the present invention will become apparent from the following description of exemplary embodiments with reference to the attached drawings.

BEST MODE FOR CARRYING OUT THE INVENTION

Preferred embodiments of the present invention will be described below with reference to the accompanying drawings. Note that the same reference numerals denote the same members throughout the drawings, and a repetitive description thereof will not be given.

Figure 1:
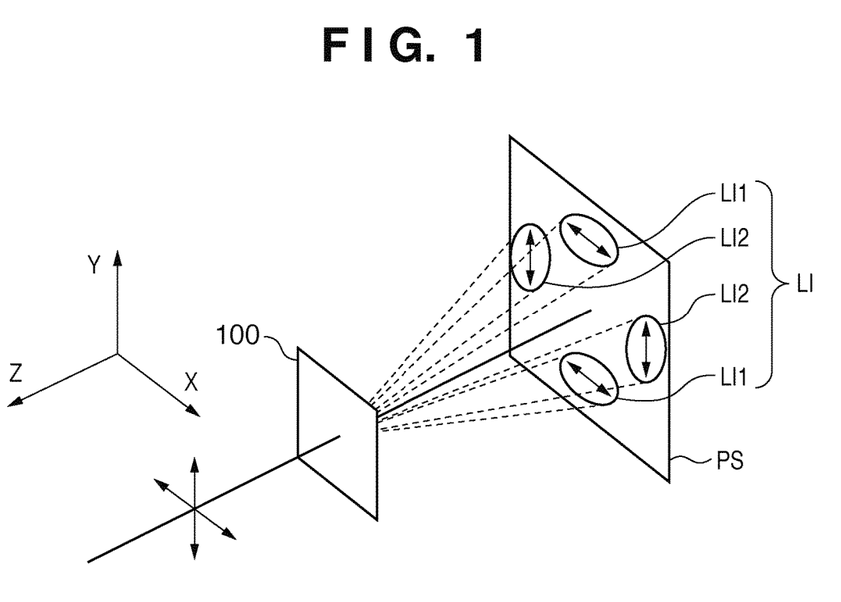
FIG. 1 is a view for explaining a computer generated hologram according to one aspect of the present invention.

FIG. 1 is a view for explaining a computer generated hologram 100 according to one aspect of the present invention. As shown in FIG. 1, the computer generated hologram 100 forms a light intensity distribution (reproduced image) LI on a predetermined plane PS (e.g., at the aperture position). Also, the computer generated hologram 100 changes the phases of X-polarized light as linearly polarized light in a first direction and Y-polarized light as linearly polarized light in a second direction, which are included in the incident light on the computer generated hologram 100. This makes it possible to make a first light intensity distribution $LI_1$ formed by X-polarized light (a polarized component in the X-axis direction of the incident light) different from a second light intensity distribution $LI_2$ formed by Y-polarized light (a polarized component in the Y-axis direction of the incident light). Note that X-polarized light as linearly polarized light in a first direction is linearly polarized light whose polarization direction is the X-axis direction, and Y-polarized light as linearly polarized light in a second direction is linearly polarized light whose polarization direction is the Y-axis direction. Accordingly, X-polarized light as linearly polarized light in a first direction and Y-polarized light as linearly polarized light in a second direction are orthogonal to each other.

Figure 2:
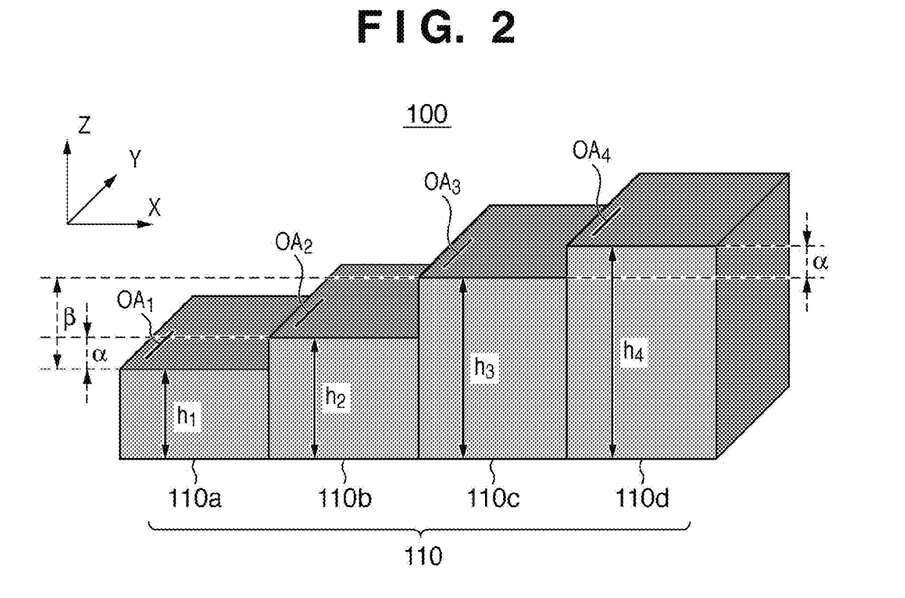
FIG. 2 is a schematic perspective view showing a cell structure which forms the computer generated hologram shown in FIG. 1.

The computer generated hologram 100 will be explained in detail below. FIG. 2 is a schematic perspective view showing cell structures which constitute the computer generated hologram 100.

The computer generated hologram 100 needs to change the phases of X-polarized light and Y-polarized light by independently controlling the wavefronts of the X-polarized light and Y-polarized light. The computer generated hologram 100 includes a plurality of anisotropic cells 110 having different refractive indices with respect to X-polarized light and Y-polarized light.

When the computer generated hologram 100 is assumed to form a phase distribution having two phase levels (a phase distribution including two phases), it needs to give binary phases to each of the wavefronts of light beams polarized in two directions. When 0 and π are used as respective phase levels, it is necessary to form four combinations of phases: (0, 0), (π, π), (π, 0), and (0, π), in order to independently give phases to the wavefronts of X-polarized light and Y-polarized light. In this manner, when a phase distribution given to each of the wavefronts of X-polarized light and Y-polarized light has two phase levels (e.g., 0 and π), it is defined as having two phase levels.

To form four combinations of phases, the computer generated hologram 100 includes four anisotropic cells: a first anisotropic cell 110a, second anisotropic cell 110b, third anisotropic cell 110c, and fourth anisotropic cell 110d as the plurality of anisotropic cells 110. The first anisotropic cell 110a, second anisotropic cell 110b, third anisotropic cell 110c, and fourth anisotropic cell 110d are made of the same material and have different thicknesses. The computer generated hologram 100 is formed by arraying the plurality of anisotropic cells 110 (the first anisotropic cell 110a, second anisotropic cell 110b, third anisotropic cell 110c, and fourth anisotropic cell 110d) in a tetragonal lattice pattern. Note, however, that the formation of a computer generated hologram, which forms a phase distribution having more than two phase levels, naturally requires more anisotropic cells having different thicknesses, in addition to four types of anisotropic cells as used herein.

The plurality of anisotropic cells 110 can change the phases of the X-polarized light and Y-polarized light included in the incident light on the anisotropic cells 110. This makes it possible to make the first light intensity distribution $LI_1$ formed on the predetermined plane PS by the X-polarized light different from the second light intensity distribution $LI_2$ formed on the predetermined plane PS by the Y-polarized light.

Thicknesses $h_1$, $h_2$, $h_3$, and $h_4$ of the first anisotropic cell 110a, second anisotropic cell 110b, third anisotropic cell 110c, and fourth anisotropic cell 110d, respectively, will be explained herein.

The second anisotropic cell 110b has the thickness $h_2$ larger than the thickness $h_1$ of the first anisotropic cell 110a by a. The fourth anisotropic cell 110d has the thickness $h_4$ larger than the thickness $h_3$ of the third anisotropic cell 110c by a. The third anisotropic cell 110c has the thickness $h_3$ larger than the thickness $h_1$ of the first anisotropic cell 110a by β.

α and β satisfy:

$$0.75\times(\lambda/N)/\{(n_1+n_2)/2-n_a\}<\alpha<1.25\times(\lambda/N)/\{(n_1+n_2)/2-n_a\} \quad (2)$$

$$0.75\times(\lambda/N)/|n_1-n_2|<\beta<1.25\times(\lambda/N)/|n_1-n_2| \quad (3)$$

$$i\times N/2+0.25<\beta/\alpha<i\times N/2+0.75 \quad (4)$$

where λ is the wavelength of the incident light on the plurality of anisotropic cells 110; $n_1$ is the refractive index of the plurality of anisotropic cells 110 with respect to X-polarized light; $n_2$ is the refractive index of the plurality of anisotropic cells 110 with respect to Y-polarized light; $n_a$ is the refractive index of the atmosphere; N is the number of phase levels of the phase distribution; and i is an integer, 2 or greater.
Note that inequalities (2) to (4) hold for a general computer generated hologram which forms a phase distribution having N phase levels.

As shown in inequalities (2) to (4), α, β, and β/α have given ranges. As long as the refractive indices $n_1$ and $n_2$ can be set (selected) arbitrarily, α, β, and β/α can be set to desired values without being given any ranges. However, when the plurality of anisotropic cells 110 are made of a birefringent material, the refractive indices $n_1$ and $n_2$ cannot be set (selected) arbitrarily, so α, β, and β/α have given ranges in this case.

α, β, and β/α ideally satisfy:

$$\alpha=(\lambda/N)\times1/\{(n_1+n_2)/2-n_a\} \quad (5)$$

$$\beta=(\lambda/N)\times1/(|n_1-n_2|) \quad (6)$$

$$\beta/\alpha=i\times N/2+\tfrac{1}{2} \quad (7)$$

The meanings of α and β will now be explained.

α is a thickness that allows a wavefront which propagates through a medium having the average refractive index of the refractive indices $n_1$ and $n_2$ to be $2\pi/N$ out of phase with that which propagates through the atmosphere having the refractive index $n_a$. In other words, α is a thickness that allows a conventional computer generated hologram having the average refractive index of the refractive indices $n_1$ and $n_2$ (i.e., a computer generated hologram which does not control polarization) to form a phase difference of $2\pi/N$. The phase difference defined as such is π for a number of phase levels N=2.

β is a thickness that allows wavefronts which respectively propagate through media having the refractive indices $n_1$ and $n_2$ to be $2\pi/N$ out of phase with each other. In other words, β is the thickness of a λ/2 plate made of an anisotropic medium having the refractive indices $n_1$ and $n_2$ for a number of phase levels N=2.

Details of α and β (more specifically, how to determine α and β) will now be explained. The combinations of phases formed by a computer generated hologram which forms a phase distribution having a number of phase levels N of 2 are assumed to be the above-mentioned four combinations of phases (0, 0), (π, π), (π, 0), and (0, π) herein.

Since the phase has a period of 2π, the four combinations of phases can be represented by (0, 0), (−π, −π), (−(i+1)π, −iπ), (−(i+2)π, −(i+1)π) for a natural number i. For i=an odd number, the third and fourth combinations of phases is reversed, so the third and fourth anisotropic cells, in turn, need only be reversed.

α is a thickness that gives a phase of about −π to both X-polarized light and Y-polarized light. β is a thickness that gives a phase of about −(i+1)π to X-polarized light and gives a phase of about −iπ to Y-polarized light. The foregoing reveals that the larger β/α is, the larger i becomes accordingly.

α is also a thickness calculated from the average refractive index of the refractive index $n_1$ with respect to X-polarized light and the refractive index $n_2$ with respect to Y-polarized light, and gives a phase of about −π to both X-polarized light and Y-polarized light, as described above. Likewise, β is calculated from the average refractive index of the refractive index $n_1$ with respect to X-polarized light and the refractive index $n_2$ with respect to Y-polarized light, and gives a phase of about −(i+1)π to X-polarized light and gives a phase of about −iπ to Y-polarized light, as described above. Hence, β is concluded to be a thickness that gives an average phase of about $-(i+\tfrac{1}{2})\pi$.

Because the given phase and the anisotropic cell thickness have a proportional relationship, β/α is $\{-(i+\tfrac{1}{2})\pi\}/\{-\pi\}=i+\tfrac{1}{2}$, yielding equation (7). Note that N=2 because a computer generated hologram which forms a phase distribution having two phase levels is assumed to be formed herein.

The relation $\beta/\alpha=i+\tfrac{1}{2}$ is the condition required to obtain combinations closest to the above-mentioned four combinations of phases. However, since this relation does not hold for a general combination of the refractive index $n_1$ with respect to X-polarized light or the refractive index $n_2$ with respect to Y-polarized light, i need only be set to a value obtained by rounding off β/α−0.50 to the nearest integer.

β/α often does not satisfy inequality (4), depending on the combination of the refractive index $n_1$ with respect to X-polarized light or the refractive index $n_2$ with respect to Y-polarized light. Under such circumstances, the least squares method or the like need only be used in determining α and β in practice. More specifically, the least squares method is used such that the differences between phases which are formed by the first to fourth anisotropic cells and calculated from α and β and (0, 0), (−π, −π), (−(i+1)π, −iπ), (−(i+2)π, −(i+1)π) are minimum. With this operation, α and β simultaneously satisfy all inequalities (2) to (4). In this way, α and β are determined.

The second and third combinations of phases are $(-\pi, -\pi)$ and $(-2\pi, -\pi)$ for i=1. In these combinations, Y-polarized light beams in the second and third anisotropic cells are in phase with each other, but X-polarized light beams in these cells are π out of phase with each other. It is difficult to change the phase of Y-polarized light while that of X-polarized light is fixed by controlling the anisotropic cell thickness, so i is typically an integer, 2 or greater. Note that i=1 holds when the refractive index $n_1$ with respect to X-polarized light and the refractive index $n_2$ with respect to Y-polarized light have a large difference and, more specifically, when the refractive indices $n_1$ and $n_2$ and the refractive index $n_a$ of the atmosphere have a relationship: $n_1-n_2>n_2-n_a$ (for $n_1>n_2>n_a$).

Although the foregoing is concerned with a special case of N=2, a general case of N will be explained below.

α is a thickness that allows a wavefront which propagates through a medium having the average refractive index of the refractive indices $n_1$ and $n_2$ to be 2π/N out of phase with that which propagates through the atmosphere having the refractive index $n_a$. β is a thickness that allows wavefronts which respectively propagate through media having the refractive indices $n_1$ and $n_2$ to be 2π/N out of phase each other.

α is also a thickness that gives a phase of about −2π/N to both X-polarized light and Y-polarized light. β is a thickness that gives a phase of about −(i+2/N)π to X-polarized light and gives a phase of about −iπ to Y-polarized light.

α is also a thickness calculated from the average refractive index of the refractive index $n_1$ with respect to X-polarized light and the refractive index $n_2$ with respect to Y-polarized light, and gives a phase of about −2π/N to both X-polarized light and Y-polarized light, as described above. Likewise, β is calculated from the average refractive index of the refractive index $n_1$ with respect to X-polarized light and the refractive index $n_2$ with respect to Y-polarized light, and gives a phase of about −(i+2/N)π to X-polarized light and gives a phase of about −iπ to Y-polarized light, as described above. Hence, β is concluded to be a thickness that gives an average phase of about −(i+1/N)π.

Because the given phase and the anisotropic cell thickness have a proportional relationship, β/α is {−(i+1/N)π/{−2π/N}=i×N/2+½, yielding equation (7)

Of the first to fourth anisotropic cells designed in this way, two anisotropic cells (corresponding to the third anisotropic cell 110c and fourth anisotropic cell 110d in this embodiment) form a phase difference of 2π/N between the X-polarized light and Y-polarized light included in the incident light. The significant difference from the conventional computer generated hologram (i.e., a computer generated hologram which does not control polarization) lies in the presence of these two anisotropic cells (the third anisotropic cell 110c and the fourth anisotropic cell 110d).

The computer generated hologram 100 can include first to fourth anisotropic cells having the same optic axis direction. In this case, optic axis directions $OA_1$, $OA_2$, $OA_3$, and $OA_4$ of the first anisotropic cell 110a, second anisotropic cell 110b, third anisotropic cell 110c, and fourth anisotropic cell 110d, respectively, are the same, as shown in FIG. 2.

In this manner, a computer generated hologram including a plurality of cells which are made of an anisotropic medium alone and have the same optic axis direction is greatly advantageous in ease of manufacture. A computer generated hologram including cells having different optic axis directions needs to be formed such that each cell is made of an anisotropic medium having direction-dependent optical properties different from those in the other cells. In contrast to this, a computer generated hologram including cells which have identical optic axes can be easily manufactured only by processing an anisotropic medium by, for example, etching.

The plurality of anisotropic cells 110 are made of a birefringent material such as calcite ($CaCO_3$) or magnesium fluoride ($MgF_2$). The computer generated hologram 100 shown in FIG. 2 includes a plurality of anisotropic cells 110 made of a birefringent material.

Figure 3:
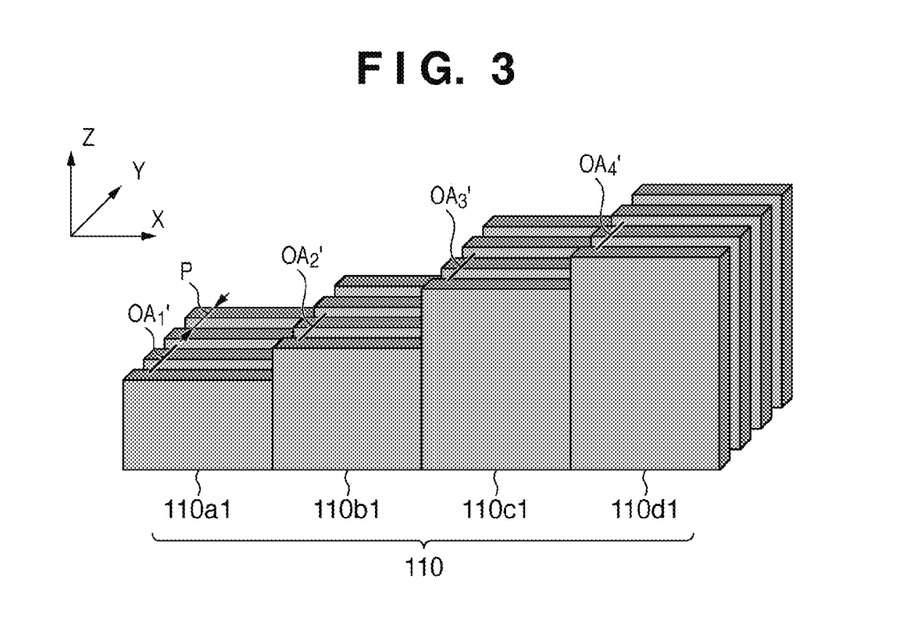
FIG. 3 is a schematic perspective view showing a computer generated hologram including a plurality of anisotropic cells having periodic structures which generate form birefringences.

Each of the plurality of anisotropic cells 110 may be made of an anisotropic medium having a periodic structure (three-dimensional structure) which generates form birefringence, as shown in FIG. 3. FIG. 3 is a schematic perspective view showing a computer generated hologram 100 including a plurality of anisotropic cells 110 (a first anisotropic cell 110a1, second anisotropic cell 110b1, third anisotropic cell 110c1, and fourth anisotropic cell 110d1) having periodic structures which generate form birefringences. In the plurality of anisotropic cells 110 of the computer generated hologram 100 shown in FIG. 3, the periodic structure which generates form birefringence have one-dimensional periodic structures with a period (pitch) P smaller than the wavelength of the incident light in order to prevent generation of any diffracted light other than 0th-order diffracted light.

Japanese Patent Laid-Open No. 2006-196715, for example, discloses a periodic structure which generates form birefringence as a diffraction grating made of quartz. This patent reference describes a periodic structure which is made of quartz having a refractive index of 1.56 with respect to a wavelength of 193 nm, and has a duty ratio (filling factor) of the form birefringence region of 1:1 (=0.5). This periodic structure has a refractive index $n_\perp$ of 1.19 in its periodic direction, and a refractive index $n_{//}$ of 1.31 in a direction perpendicular to its periodic direction.

A periodic structure which generates form birefringence is microscopically made of media of two types, but can be macroscopically said to be made of a uniform anisotropic medium having different refractive indices with respect to X-polarized light and Y-polarized light. In this embodiment, the optical properties of a periodic structure which generates form birefringence are macroscopically viewed. Thus, the first anisotropic cell 110a1 to fourth anisotropic cell 110d1 having periodic structures which are made of the same material and have nearly the same duty ratio are said to be made of the same material in that case.

The computer generated hologram 100 shown in FIG. 3 can include first to fourth anisotropic cells having the same optic axis direction. In this case, optic axis directions $OA_1'$, $OA_2'$, $OA_3'$, and $OA_4'$ of the first anisotropic cell 110a1, second anisotropic cell 110b1, third anisotropic cell 110c1, and fourth anisotropic cell 110d1, respectively, are the same, as shown in FIG. 3.

In this manner, a computer generated hologram including a plurality of cells having periodic structures which generate form birefringences is greatly advantageous in ease of manufacture as long as all of the plurality of cells have the same optic axis direction. When all the cells have the same optic axis direction, periodic structures which generate form birefringences, in turn, have the same periodic direction. In this case, a computer generated hologram can be easily manufactured only by forming periodic structures in the same periodic direction. In addition, as long as periodic structures which generate form birefringences are allowed to have the same periodic direction, a computer generated hologram can be manufactured by forming them in advance and processing them.

In this embodiment, since the computer generated hologram 100 is assumed to give a phase distribution having two phase levels to each of the wavefronts formed by X-polarized light and Y-polarized light, it includes four types of anisotropic cells. Note, however, that the formation of a computer generated hologram, which gives a phase distribution having more than two phase levels to each of the wavefronts of X-polarized light and Y-polarized light, naturally requires more anisotropic cells having different thicknesses, in addition to the four types of anisotropic cells as used herein.

Although only the structures of the anisotropic cells which constitute the computer generated hologram 100 have been explained in this embodiment, there remains a serious challenge to manufacture an element having a thickness on the order of a wavelength. There remains another serious challenge to keep the periodic structures, which generate form birefringences, floating in the air, as shown in FIG. 3. To overcome these difficulties, in practice, the plurality of anisotropic cells 110 (e.g., the first anisotropic cell 110$a$1, second anisotropic cell 110$b$1, third anisotropic cell 110$c$1, and fourth anisotropic cell 110$d$1) are arrayed on a substrate such as a quartz substrate. A birefringent material can also be used for a substrate, which has a specified thickness. How to specify the thickness of a substrate made of a birefringent material will be explained in the first and second embodiments (to be described later). When the same birefringent material is used for both the anisotropic cells and the substrate, a computer generated hologram can be practically manufactured using one medium.

Detailed design examples of the computer generated hologram 100 and an exposure apparatus to which the computer generated hologram 100 is applied will be explained below.

<First Embodiment>

Figure 4:
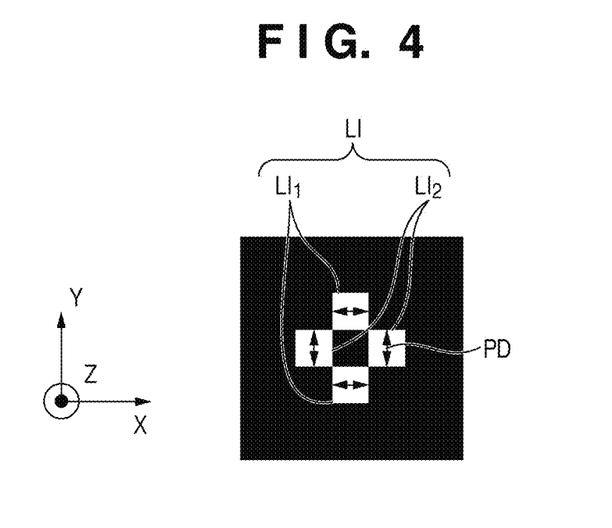
FIG. 4 is a view showing an example of a quadrupole light intensity distribution (target image) formed by the computer generated hologram according to one aspect of the present invention.

A design example of a computer generated hologram which forms a quadrupole light intensity distribution by S-polarized light as a target image will be explained in the first embodiment. More specifically, a design example of a computer generated hologram 100 which forms a quadrupole light intensity distribution (target image) LI as shown in FIG. 4 will now be explained. FIG. 4 is a view showing an example of the quadrupole light intensity distribution (target image) LI formed by the computer generated hologram 100.

The light intensity distribution LI shown in FIG. 4 includes a first light intensity distribution $LI_1$ formed by X-polarized light and a second light intensity distribution $LI_2$ formed by Y-polarized light. Polarization directions PD in the first light intensity distribution $LI_1$ and second light intensity distribution $LI_2$ are parallel to the circumferential direction of a circle (i.e., correspond to S-polarization).

Figure 5:
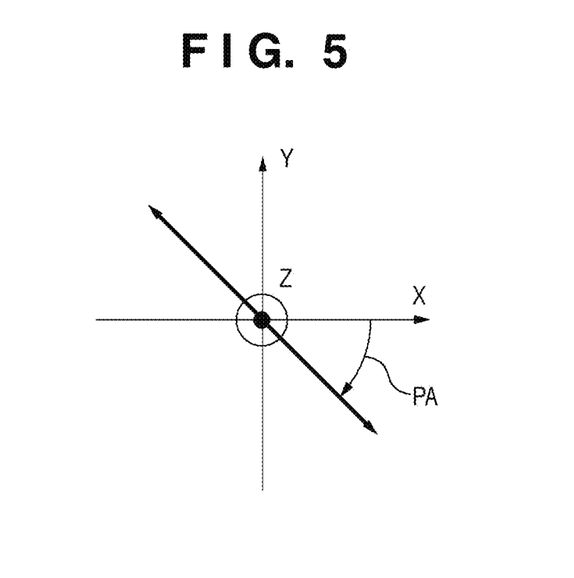
FIG. 5 is a diagram showing an example of the incident light on the computer generated hologram according to one aspect of the present invention.

In the first embodiment, the computer generated hologram 100 (a plurality of anisotropic cells 110) receives linearly polarized light which has a wavelength of 248 nm and, as shown in FIG. 5, a polarization direction angle (azimuth angle) PA of −45° with respect to the X-axis. The linearly polarized light shown in FIG. 5 has a polarization state in which the phase of X-polarized light advances by $\pi$ relative to that of Y-polarized light. FIG. 5 is a diagram showing an example of the incident light on the computer generated hologram 100.

Also in the first embodiment, the plurality of anisotropic cells 110 (a first anisotropic cell 110$a$ to fourth anisotropic cell 110$d$) are made of calcite ($CaCO_3$). The plurality of anisotropic cells 110 have a refractive index $n_1$ of 1.774 with respect to X-polarized light, and a refractive index $n_2$ of 1.535 with respect to Y-polarized light.

Figure 6:
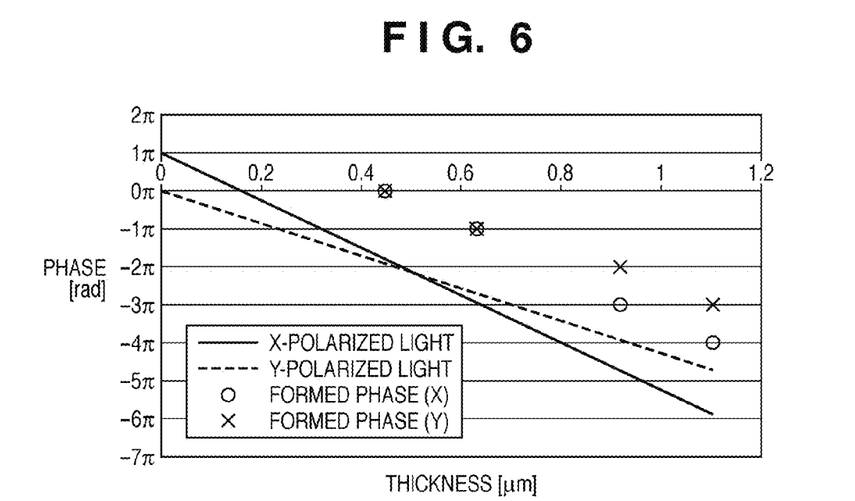
FIG. 6 is a graph showing changes in phase with respect to the anisotropic cell thickness, and four combinations of phases.

FIG. 6 is a graph showing changes in phase with respect to the anisotropic cell thickness, and the above-described four combinations of phases. In FIG. 6, the ordinate indicates the phase [rad], and the abscissa indicates the anisotropic cell thickness [μm].

Referring to FIG. 6, downward-sloping changes in phase with respect to the anisotropic cell thickness mean that the phase retards as the thickness of an anisotropic cell (computer generated hologram) increases. FIG. 6 also reveals that since the refractive index $n_1$ with respect to X-polarized light is higher than the refractive index $n_2$ with respect to Y-polarized light, a change in phase of X-polarized light has a slope larger than that of a change in phase of Y-polarized light (the former change is more sloping than the latter change). More specifically, a change in phase of X-polarized light has a slope of $-2\pi/\{\lambda/(n_1-n_a)\}$, and a change in phase of Y-polarized light has a slope of $-2\pi/\{\lambda/(n_2-n_a)\}$. Note that in FIG. 6, the phase of X-polarized light is in for an anisotropic cell thickness of 0 because the phase of the X-polarized light included in the incident light advances by $\pi$ relative to that of the Y-polarized light included in the incident light.

$\alpha$, $\beta$, and thicknesses $h_1$ to $h_4$ of the first anisotropic cell 110$a$ to fourth anisotropic cell 110$d$ will now be explained in detail.

When the refractive index $n_a$ of the atmosphere is 1.0, the initial values of $\alpha$ and $\beta$ are calculated from equations (5) and (6) as $\alpha=0.189$ and $\beta=0.519$. Since i in inequality (4) is a value obtained by rounding off $\beta/\alpha-0.50=2.24$ to the nearest value, i=2. The four combinations of phases formed by the first anisotropic cell 110$a$ to fourth anisotropic cell 110$d$ are (0, 0), $(-\pi, -\pi)$, $(-(i+1)\pi, -i\pi)$, and $(-(i+2)\pi, -(i+1)\pi)$. Hence, the four combinations of phases formed by the first anisotropic cell 110$a$ to fourth anisotropic cell 110$d$ are (0, 0), $(-\pi, -\pi)$, $(-3\pi, -2\pi)$, and $(-4\pi, -3\pi)$ for i=2.

Based on $\alpha=0.189$ and $\beta=0.519$ (the initial values of $\alpha$ and $\beta$) calculated from equations (5) and (6), the thicknesses $h_1$ to $h_4$ of the first anisotropic cell 110$a$ to fourth anisotropic cell 110$d$ are calculated. In this case, the first anisotropic cell 110$a$ has a thickness $h_1=0.424$, the second anisotropic cell 110$b$ has a thickness $h_2=0.613$, the third anisotropic cell 110$c$ has a thickness $h_3=0.943$, and the fourth anisotropic cell 110$d$ has a thickness $h_4=1.132$.

FIG. 6 shows phases formed for the above-described four combinations of phases and the thicknesses $h_1$ to $h_4$ of the first anisotropic cell 110$a$ to fourth anisotropic cell 110$d$.

Figure 7:
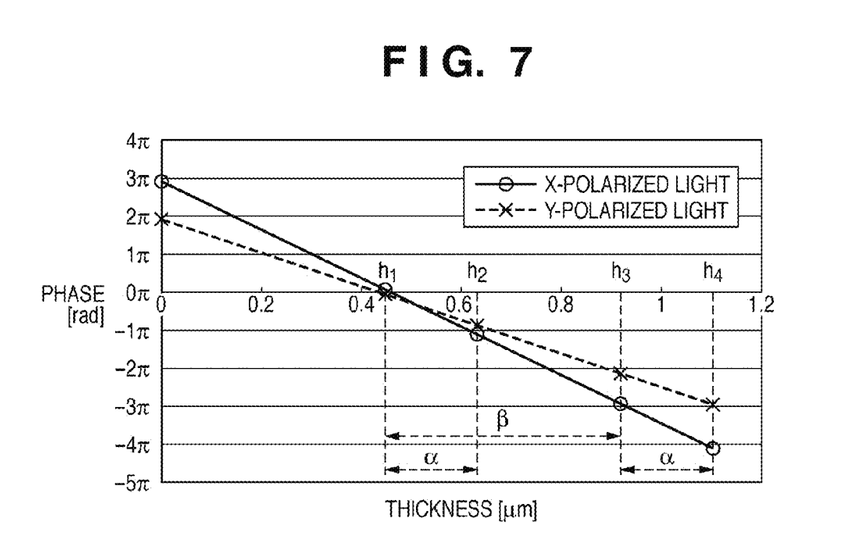
FIG. 7 is a graph showing the result of fitting the graph shown in FIG. 6 by the least squares method.

FIG. 7 is a graph showing the result of fitting the graph shown in FIG. 6 using the least squares method. In FIG. 7, the thicknesses $h_1$ to $h_4$ of the first anisotropic cell 110$a$ to fourth anisotropic cell 110$d$ are calculated again by approximation using the least squares method. More specifically, the anisotropic cell thickness is calculated so as to reduce the differences between the thicknesses $h_1$ to $h_4$ of the first anisotropic cell 110$a$ to fourth anisotropic cell 110$d$ and the four combinations of phases: (0, 0), $(-\pi, -\pi)$, $(-3\pi, -2\pi)$, and $(-4\pi, -3\pi)$. Note that in FIG. 7, the ordinate indicates the phase [rad], and the abscissa indicates the anisotropic cell thickness [μm], as in FIG. 6.

Referring to FIG. 7, the phases of the four combinations of phases and the anisotropic cell thickness slightly shift in response to a shift in the phase of the incident light. The thicknesses $h_1$ to $h_4$ of the first anisotropic cell 110$a$ to fourth anisotropic cell 110$d$, which are calculated again by approximation using the least squares method, are $h_1=0.449$, $h_2=0.632$, $h_3=0.924$, and $h_4=1.107$. Also, $\alpha=0.183$ and $\beta=0.475$. The thicknesses $h_1$ to $h_4$ of the first anisotropic cell 110$a$ to fourth anisotropic cell 110$d$ shown in FIG. 7 correspond to those shown in FIG. 2. Also, $\alpha$ and $\beta$ shown in FIG. 7 correspond to those in inequalities (2) to (4).

The thus calculated thicknesses $h_1$ to $h_4$ serve as those of the first anisotropic cell 110$a$ to fourth anisotropic cell 110$d$.

α and β used in calculating (determining) the thicknesses $h_1$ to $h_4$ of the first anisotropic cell 110a to fourth anisotropic cell 110d satisfy:

$$0.142 < (\alpha = 0.183) < 0.237 \quad (8)$$

$$0.389 < (\beta = 0.475) < 0.649 \quad (9)$$

$$2.25 < (\beta/\alpha = 2.59) < 2.75 \quad (10)$$

Figure 8:
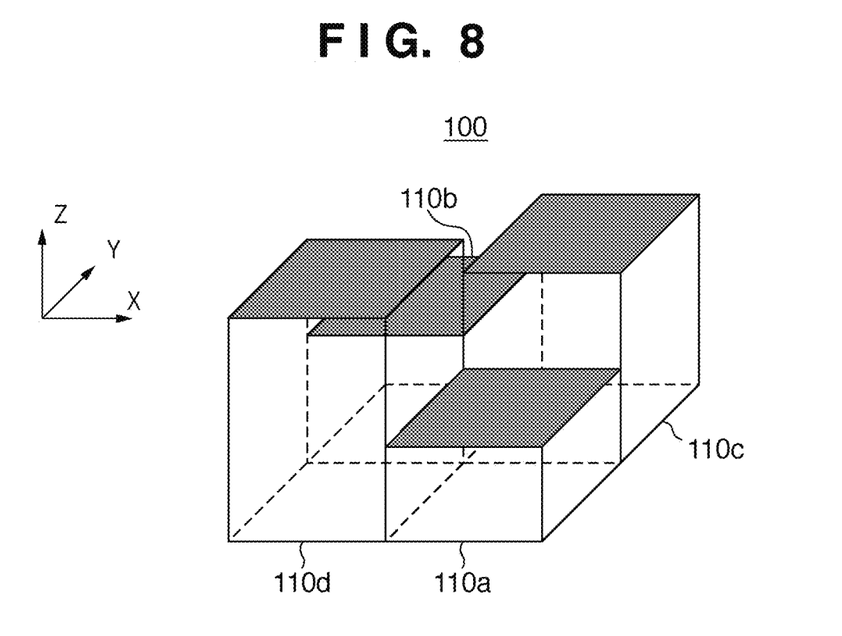
FIG. 8 is a schematic perspective view showing a computer generated hologram designed to form the light intensity distribution (target image) shown in FIG. 4.

FIG. 8 is a schematic perspective view showing the computer generated hologram 100 designed to form the light intensity distribution (target image) LI shown in FIG. 4. Note that FIG. 8 shows the anisotropic cells 110 as semi-transparent bodies in order to enhance visibility of the second anisotropic cell 110b.

The first anisotropic cell 110a to fourth anisotropic cell 110d in the computer generated hologram 100 shown in FIG. 8 have the same structures as those shown in FIG. 2. In other words, the computer generated hologram 100 shown in FIG. 8 has an arrangement obtained by changing the positions of the first anisotropic cell 110a to fourth anisotropic cell 110d which constitute the computer generated hologram 100 shown in FIG. 2. The computer generated hologram 100 shown in FIG. 8 includes 2×2 anisotropic cells. Although FIG. 8 shows a configuration corresponding to one period alone, a computer generated hologram is generally formed by repeatedly arranging identical configurations in the X and Y directions.

Figure 9:
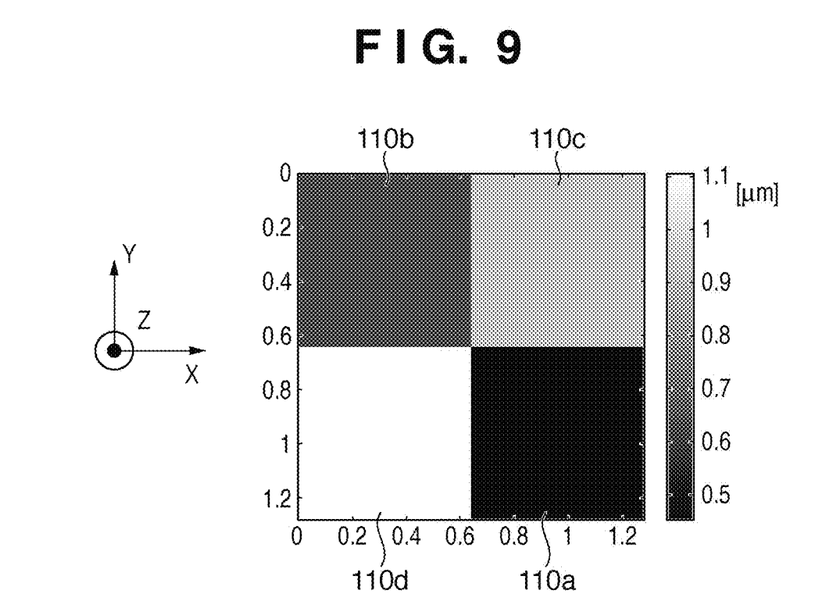
FIG. 9 is a chart showing the thickness of the computer generated hologram shown in FIG. 8.

FIG. 9 is a chart showing the thickness of the computer generated hologram 100 (those of the first anisotropic cell 110a to fourth anisotropic cell 110d) shown in FIG. 8. In FIG. 9, the density represents the thickness (in the Z direction) of the computer generated hologram 100 (those of the first anisotropic cell 110a to fourth anisotropic cell 110d). A lighter color indicates a larger thickness, and a darker color indicates a smaller thickness. The numeric values shown in FIG. 9 indicate the thickness of the computer generated hologram 100 (unit: µm).

The computer generated hologram 100 shown in FIGS. 8 and 9 has an arrangement in which anisotropic cells that are π out of phase with each other for X-polarized light are alternately arranged parallel to the Y direction (i.e., in the vertical direction). Also, the computer generated hologram 100 shown in FIGS. 8 and 9 has an arrangement in which anisotropic cells that are π out of phase with each other for Y-polarized light are alternately arranged parallel to the X direction (i.e., in the lateral direction). Hence, the computer generated hologram 100 shown in FIGS. 8 and 9 generates ±1st-order diffracted light beams parallel to the Y direction upon receiving X-polarized light, and generates ±1st-order diffracted light beams parallel to the X direction upon receiving Y-polarized light.

In the first embodiment, the incident light is linearly polarized light having an azimuth angle PA of −45° (i.e., including X-polarized light and Y-polarized light with the same intensity) (see FIG. 5). However, in forming a light intensity distribution (target image) including X-polarized light and Y-polarized light which are completely separated from each other, as shown in FIG. 4, the incident light may have another polarization state. For example, the incident light may be linearly polarized light having an azimuth angle of 45°, circularly polarized light including X-polarized light and Y-polarized light with the same intensity, or non-polarized light including X-polarized light and Y-polarized light with the same intensity in that case.

In addition, in forming a light intensity distribution (target image) including X-polarized light and Y-polarized light which are completely separated from each other, as shown in FIG. 4, the thickness of a substrate which is made of a birefringent material and on which a plurality of anisotropic cells of a computer generated hologram are arrayed can be selected arbitrarily.

In this manner, according to the first embodiment, it is possible to provide a computer generated hologram which can suppress an illuminance variation and a loss in light amount and form a light intensity distribution (reproduced image) with a predetermined shape and polarization state, and yet is advantageous in ease of manufacture.

<Second Embodiment>

Figure 10:
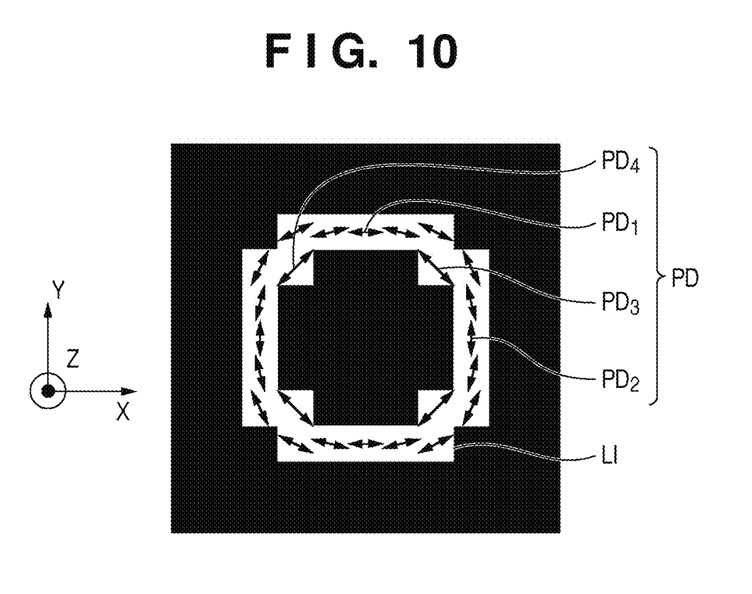
FIG. 10 is a view showing an example of an annular light intensity distribution formed by the computer generated hologram according to one aspect of the present invention.

A design example of a computer generated hologram which forms an annular light intensity distribution by S-polarized light as a target image will be explained in the second embodiment. More specifically, a design example of a computer generated hologram 100 which forms an annular light intensity distribution (target image) LI as shown in FIG. 10 will now be explained. FIG. 10 is a view showing an example of the annular light intensity distribution LI formed by the computer generated hologram 100.

Polarization directions PD in the light intensity distribution LI shown in FIG. 10 include a plurality of polarization directions $PD_1$ to $PD_4$ and are parallel to the circumferential directions of concentric circles (i.e., correspond to S-polarization).

In the second embodiment, the computer generated hologram 100 (a plurality of anisotropic cells 110) receives light having a wavelength of 248 nm.

Also in the second embodiment, the plurality of anisotropic cells 110 (a first anisotropic cell 110a to fourth anisotropic cell 110d) are made of calcite ($CaCO_3$). The plurality of anisotropic cells 110 have a refractive index $n_1$ of 1.774 with respect to X-polarized light, and a refractive index $n_2$ of 1.535 with respect to Y-polarized light.

Figure 11:
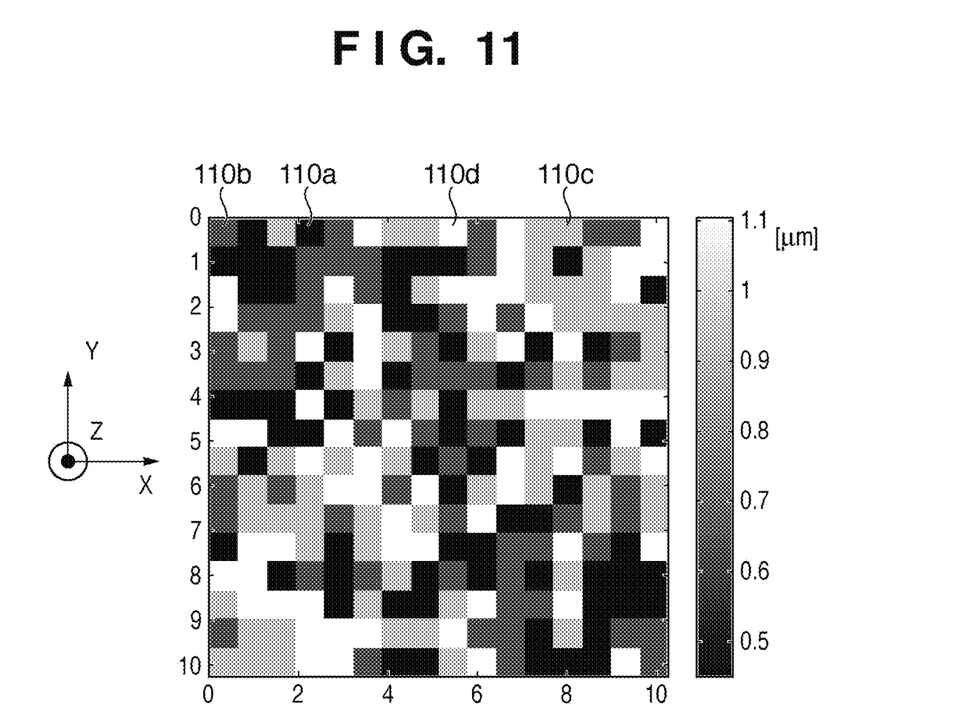
FIG. 11 is a chart showing the thickness of a computer generated hologram designed to form the light intensity distribution (target image) shown in FIG. 10.

FIG. 11 is a chart showing the thickness of the computer generated hologram 100 designed to form the light intensity distribution (target image) LI shown in FIG. 10. In FIG. 11, the density represents the thickness (in the Z direction) of the computer generated hologram 100. A lighter color indicates a larger thickness, and a darker color indicates a smaller thickness. The numeric values shown in FIG. 11 indicate the thickness of the computer generated hologram 100 (unit: µm).

The first anisotropic cell 110a to fourth anisotropic cell 110d in the computer generated hologram 100 shown in FIG. 11 have the same structures as those shown in FIG. 2. In other words, the computer generated hologram 100 shown in FIG. 11 has an arrangement obtained by changing the positions of the first anisotropic cell 110a to fourth anisotropic cell 110d which constitute the computer generated hologram 100. The computer generated hologram 100 shown in FIG. 11 includes 16×16 anisotropic cells. Although FIG. 11 shows a configuration corresponding to one period alone, a computer generated hologram is generally formed by repeatedly arranging identical configurations in the X and Y directions.

In the second embodiment, the target image is the light intensity distribution LI including obliquely, linearly polarized light beams which have the polarization directions $PD_3$ and $PD_4$ and are formed by both X-polarized light and Y-polarized light, instead of using X-polarized light and Y-polarized light that are completely separated from each other, as shown in FIG. 10. Hence, the computer generated hologram 100 shown in FIG. 11 is designed to receive polarized light with a polarization state limited and, more specifically, linearly polarized light having an azimuth angle PA of −45° (see FIG. 5).

In addition, in forming a light intensity distribution (target image) including obliquely, polarization directions formed by both X-polarized light and Y-polarized light, as shown in FIG. 10, the thickness of a substrate which is made of a birefringent material and on which a plurality of anisotropic cells of a computer generated hologram are arrayed cannot be selected arbitrarily. To prevent any shift in phase between X-polarized light and Y-polarized light on the substrate, the substrate thickness needs to be $2\beta i$ for $\beta$ in equation (6), where i is an integer, 1 or greater).

In this manner, according to the second embodiment, it is possible to provide a computer generated hologram which can suppress an illuminance variation and a loss in light amount and form a light intensity distribution (reproduced image) with a predetermined shape and polarization state, and yet is advantageous in ease of manufacture.

Although a case in which a relatively small number of anisotropic cells constitute a computer generated hologram has been exemplified in the first and second embodiments, a light intensity distribution with a predetermined shape and polarization state can be formed even when increasing the number of anisotropic cells which constitute a computer generated hologram. Increasing the number of anisotropic cells which constitute a computer generated hologram reduces the pixel size at which the light intensity distribution (target image) is divided into pixel regions. This makes it possible to form a more even light intensity distribution.

<Third Embodiment>

Figure 12:
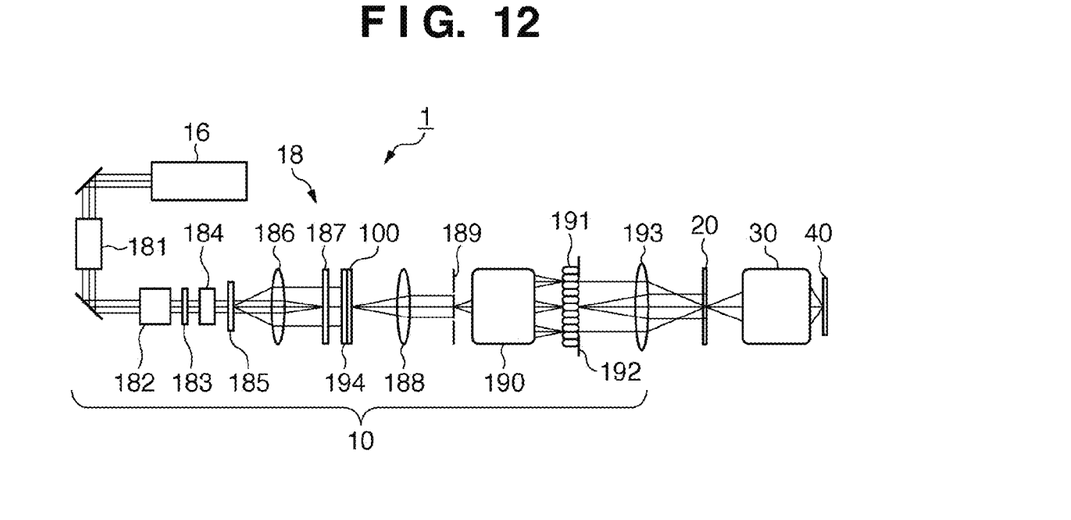
FIG. 12 is a view showing the arrangement of an exposure apparatus according to one aspect of the present invention.

In the third embodiment, an exposure apparatus 1 to which the computer generated hologram 100 according to the present invention is applied will be explained below with reference to FIG. 12. FIG. 12 is a view showing the arrangement of the exposure apparatus 1 according to one aspect of the present invention.

In this embodiment, the exposure apparatus 1 is a projection exposure apparatus which transfers the pattern of a reticle 20 onto a wafer 40 by the step & scan scheme. However, the exposure apparatus 1 can adopt the step & repeat scheme or another exposure scheme.

As shown in FIG. 12, the exposure apparatus 1 includes an illumination apparatus 10, a reticle stage (not shown) for supporting the reticle 20, a projection optical system 30, and a wafer stage (not shown) for supporting the wafer 40.

The illumination apparatus 10 illuminates the reticle 20 on which a circuit pattern to be transferred is formed, and includes a light source 16 and illumination optical system 18.

The light source 16 is, for example, an excimer laser such as an ArF excimer laser with a wavelength of about 193 nm or a KrF excimer laser with a wavelength of about 248 nm. However, the light source 16 is not particularly limited to an excimer laser, and may be, e.g., an $F_2$ laser with a wavelength of about 157 nm or a mercury lamp with a narrow wavelength range.

The illumination optical system 18 illuminates the reticle 20 with light from the light source 16, and performs modified illumination on the reticle 20 in a predetermined polarization state while ensuring a predetermined illuminance in this embodiment. The illumination optical system 18 includes a light extension optical system 181, beam shaping optical system 182, polarization controller 183, phase controller 184, exit angle saving optical element 185, relay optical system 186, multibeam generation unit 187, polarization state adjusting unit 194 and computer generated hologram 100. The illumination optical system 18 also includes a relay optical system 188, aperture 189, zoom optical system 190, multibeam generation unit 191, aperture stop 192, and irradiation unit 193.

The light extension optical system 181 deflects light from the light source 16 to guide it to the beam shaping optical system 182. The beam shaping optical system 182 shapes the section of the light from the light source 16 into a desired shape by converting the horizontal to vertical ratio of the section of the light from the light source 16 into a desired value (e.g., by changing the sectional shape from a rectangle to a square). The beam shaping optical system 182 forms a light beam with a size and an angle of divergence which are required to illuminate the multibeam generation unit 187.

The polarization controller 183 includes, e.g., a linear polarizer and has a function of removing unnecessary polarized light components. It is possible to efficiently convert light from the light source 16 into desired linearly polarized light by minimizing polarized light components removed (shielded) by the polarization controller 183.

The phase controller 184 converts the linearly polarized light obtained by the polarization controller 183 into circularly polarized light by giving a phase difference of $\lambda/4$ to it.

The exit angle saving optical element 185 includes, e.g., an optical integrator (e.g., a fly-eye lens or fiber bundle including a plurality of microlenses), and outputs the light at a predetermined angle of divergence.

The relay optical system 186 converges the light which emerges from the exit angle saving optical element 185 on the multibeam generation unit 187. The relay optical system 186 adjusts the exit surface of the exit angle saving optical element 185 and the incident surface of the multibeam generation unit 187 to hold the Fourier transform relationship (the relationship between the object plane and the pupil plane or that between the pupil plane and the image plane).

The multibeam generation unit 187 includes an optical integrator (e.g., a fly-eye lens or fiber bundle including a plurality of microlenses) for uniformly illuminating the polarization state adjusting unit 194 and computer generated hologram 100. The exit surface of the multibeam generation unit 187 forms a light source surface including a plurality of point light sources. The light which emerges from the multibeam generation unit 187 impinges on the computer generated hologram 100 as circularly polarized light.

The polarization state adjusting unit 194 gives a phase difference of $\lambda/4$ to the light circularly polarized by the phase controller 184 to convert the circularly polarized light into linearly polarized light having a predetermined polarization direction. The light emerging from the polarization state adjusting unit 194 impinges on the computer generated hologram 100 as linearly polarized light. Although the polarization state adjusting unit 194 is located immediately before the computer generated hologram 100 in this embodiment, it may be located anywhere between the phase controller 184 and the computer generated hologram 100 and, for example, may be located immediately after the phase controller 184.

The computer generated hologram 100 forms a light intensity distribution (e.g., a light intensity distribution LI as shown in FIG. 4 or 10) at the position of the aperture 189 via the relay optical system 188. As described above, the computer generated hologram 100 changes not only a wavefront having one polarization direction but also the phases of X-polarized light and Y-polarized light over the entire wavefront, and therefore can form a predetermined light intensity distribution practically without generating any loss in light amount. Note that the computer generated hologram 100 can take any of the foregoing forms, and a detailed description thereof will not be given.

The aperture 189 has a function of passing only a light intensity distribution formed by the computer generated hologram 100. The computer generated hologram 100 and aperture 189 are set to hold the Fourier transform relationship.

The zoom optical system 190 enlarges a light intensity distribution formed by the computer generated hologram 100 at a predetermined magnification, and projects it onto the multibeam generation unit 191.

The multibeam generation unit 191 is inserted on the pupil plane of the illumination optical system 18, and forms, on its exit surface, a light source image (effective light source distribution) corresponding to the light intensity distribution formed at the position of the aperture 189. In this embodiment, the multibeam generation unit 191 includes an optical integrator such as a fly-eye lens or cylindrical lens array. The aperture stop 192 is inserted near the exit surface of the multibeam generation unit 191.

The irradiation unit 193 includes, e.g., a condenser optical system and illuminates the reticle 20 with an effective light source distribution formed on the exit surface of the multibeam generation unit 191.

The reticle 20 has a circuit pattern and is supported and driven by the reticle stage (not shown). Diffracted light generated by the reticle 20 is projected onto the wafer 40 via the projection optical system 30. Since the exposure apparatus 1 is of the step & scan scheme, it transfers the pattern of the reticle 20 onto the wafer 40 by scanning them.

The projection optical system 30 projects the pattern of the reticle 20 onto the wafer 40. The projection optical system 30 can be a dioptric system, catadioptric system, or catoptric system.

The wafer 40 is a substrate onto which the pattern of the reticle 20 is projected (transferred), and is supported and driven by the wafer stage (not shown). However, it is also possible to use a glass plate or another substrate in place of the wafer 40. The wafer 40 is coated with a photoresist.

In exposure, light emitted by the light source 16 illuminates the reticle 20 by the illumination optical system 18. The light which bears the information of the pattern of the reticle 20 forms an image on the wafer 40 by the projection optical system 30. The illumination optical system 18 used for the exposure apparatus 1 can suppress any illumination variation and loss in light amount, and form a light intensity distribution with a desired shape and polarization state by the computer generated hologram 100. Hence, the exposure apparatus 1 can provide high-quality devices (e.g., a semiconductor device, an LCD device, an image sensing device (e.g., a CCD), and a thin-film magnetic head) with a high throughput and a good economical efficiency. These devices are fabricated by a step of exposing a substrate (e.g., a wafer or glass plate) coated with a resist using the exposure apparatus 1, a step of developing the exposed substrate, and other known steps.

The ratio between the light intensities of a first light intensity distribution LI and second light intensity distribution $LI_2$ when the computer generated hologram 100 forms a light intensity distribution LI shown in FIG. 4 will be explained herein.

In the first embodiment, the incident light is linearly polarized light having an azimuth angle PA of −45° (see FIG. 5) in order to set the ratio between the light intensities of the first light intensity distribution $LI_1$ and second light intensity distribution $LI_2$ in the light intensity distribution LI shown in FIG. 4 to a predetermined value. Note that a plurality of anisotropic cells have different refractive indices with respect to X-polarized light and Y-polarized light, and, in turn, have slightly different transmittances with respect to X-polarized light and Y-polarized light. Also, the thicknesses of first to fourth anisotropic cells are calculated so as to form four combinations of phases. As can be understood from the graph shown in FIG. 7, the phases with respect to the thicknesses of the first to fourth anisotropic cells are slightly shifted from integer multiples of π. Hence, when the incident light is linearly polarized light having an azimuth angle PA of −45° (see FIG. 5), the ratio between the light intensities of the first light intensity distribution $LI_1$ and second light intensity distribution $LI_2$ deviates from a predetermined value.

The mechanism in which the ratio between the light intensities of the first light intensity distribution $LI_1$ and second light intensity distribution $LI_2$ in the light intensity distribution LI shown in FIG. 4 deviates from a predetermined value will now be explained using concrete numeric values.

In the light intensity distribution LI shown in FIG. 4, the ratio between the light intensities of the first light intensity distribution $LI_1$ and second light intensity distribution $LI_2$ is preferably 1:1. For example, a phase distribution formed by the computer generated hologram 100 shown in FIGS. 8 and 9 is calculated by electromagnetic field analysis, and the complex amplitude of the calculated phase distribution is Fourier-transformed, thereby obtaining a reconstructed image. In this case, the ratio between the light intensities of the first light intensity distribution $LI_1$ and second light intensity distribution $LI_2$ is 1.000:0.947.

When the ratio between the light intensities of the first light intensity distribution $LI_1$ and second light intensity distribution $LI_2$ deviates from a predetermined value, it can be corrected by adjusting the azimuth angle PA. In this embodiment, since the light intensity of the first light intensity distribution $LI_1$ is higher than that of the second light intensity distribution $LI_2$, the azimuth angle PA need only be tan(sqrt (1.000/0.974))=45.784°. When a phase distribution formed by the computer generated hologram 100 shown in FIGS. 8 and 9 is calculated assuming that the azimuth angle PA is 45.784° by electromagnetic field analysis, the ratio between the light intensities of the first light intensity distribution $LI_1$ and second light intensity distribution $LI_2$ is 1.000:0.9999. Since the purpose of the foregoing is to demonstrate the fact that adjusting the azimuth angle PA makes it possible to correct the ratio between the light intensities of the first light intensity distribution $LI_1$ and second light intensity distribution $LI_2$, a description of parameters used in the electromagnetic field analysis will not be given.

In the exposure apparatus 1, the polarization state adjusting unit 194 can adjust the azimuth angle PA of linearly polarized light which impinges on the computer generated hologram 100. Hence, using the polarization state adjusting unit 194, the exposure apparatus 1 can adjust (correct) the ratio between the light intensities of the first light intensity distribution $LI_1$ and second light intensity distribution $LI_2$ by adjusting the azimuth angle PA of linearly polarized light which impinges on the computer generated hologram 100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2008-218823 filed on Aug. 27, 2008, which is hereby incorporated by reference herein in its entirety.

The invention claimed is:
1. A computer generated hologram which forms a light intensity distribution on a predetermined plane, the hologram comprising:
a plurality of anisotropic cells having different refractive indices with respect to linearly polarized light in a first direction and linearly polarized light in a second direction perpendicular to the linearly polarized light in the first direction, wherein said plurality of anisotropic cells are made of an identical material and includes a first anisotropic cell, a second anisotropic cell, a third anisotropic cell, and a fourth anisotropic cell which have different thicknesses, said plurality of anisotropic cells change phases of linearly polarized light in the first direction and linearly polarized light in the second direction, which are included in incident light on said plurality of anisotropic cells, thereby making a first light intensity distribution formed on the predetermined plane by the linearly polarized light in the first direction included in the incident light different from a second light intensity distribution formed on the predetermined plane by the linearly polarized light in the second direction included in the incident light, said second anisotropic cell has a thickness larger than a thickness of said first anisotropic cell by $\alpha$, said fourth anisotropic cell has a thickness larger than a thickness of said third anisotropic cell by $\alpha$, said third anisotropic cell has the thickness larger than the thickness of said first anisotropic cell by $\beta$, and said plurality of anisotropic cells satisfy:

$$0.75 \times (\lambda/N)/\{(n_1+n_2)/2-n_a\} < \alpha < 1.25 \times (\lambda/N)/\{(n_1+n_2)/2-n_a\},$$

$$0.75 \times (\lambda/N)/|n_1-n_2| < \beta < 1.25 \times (\lambda/N)/|n_1-n_2|, \text{ and}$$

$$i \times N/2 + 0.25 < \beta/\alpha < i \times N/2 + 0.75$$

where $\lambda$ is a wavelength of the incident light on said plurality of anisotropic cells; $n_1$ is the refractive index of said plurality of anisotropic cells with respect to the linearly polarized light in the first direction; $n_2$ is the refractive index of said plurality of anisotropic cells with respect to the linearly polarized light in the second direction; $n_a$ is a refractive index of an atmosphere; N is the number of phase levels of a phase distribution according to which the phases of the linearly polarized light in the first direction and the linearly polarized light in the second direction, which are included in the incident light, are changed; and i is an integer not less than 2.

2. The hologram according to claim 1, wherein two anisotropic cells of said first anisotropic cell, said second anisotropic cell, said third anisotropic cell, and said fourth anisotropic cell form a phase difference of $2\pi/N$ between the linearly polarized light in the first direction and the linearly polarized light in the second direction, which are included in the incident light.

3. The hologram according to claim 1, wherein optic axis directions of said first anisotropic cell, said second anisotropic cell, said third anisotropic cell, and said fourth anisotropic cell are identical.

4. The hologram according to claim 1, wherein said plurality of anisotropic cells are made of a birefringent material.

5. The hologram according to claim 1, wherein said plurality of anisotropic cells have periodic structures which generate form birefringences.

6. An exposure apparatus comprising:
an illumination optical system configured to illuminate a reticle with light from a light source; and
a projection optical system configured to project a pattern of the reticle onto a substrate,
wherein the illumination optical system includes a computer generated hologram according to claim 1.

7. The apparatus according to claim 6, wherein
said illumination optical system includes an adjusting unit configured to adjust an azimuth angle of linearly polarized light which impinges on the computer generated hologram, and
a ratio between light intensities of the first light intensity distribution and the second light intensity distribution is adjusted by adjusting, using said adjusting unit, the azimuth angle of the linearly polarized light which impinges on the computer generated hologram.

8. A device fabrication method comprising steps of:
exposing a substrate using an exposure apparatus; and
performing a development process for the substrate exposed,
wherein the exposure apparatus includes
an illumination optical system configured to illuminate a reticle with light from a light source; and
a projection optical system configured to project a pattern of the reticle onto a substrate,
wherein the illumination optical system includes a computer generated hologram which forms a light intensity distribution on a predetermined plane, and
wherein the computer generated hologram includes a plurality of anisotropic cells having different refractive indices with respect to linearly polarized light in a first direction and linearly polarized light in a second direction perpendicular to the linearly polarized light in the first direction,
wherein said plurality of anisotropic cells are made of an identical material and includes a first anisotropic cell, a second anisotropic cell, a third anisotropic cell, and a fourth anisotropic cell which have different thicknesses,
said plurality of anisotropic cells change phases of linearly polarized light in the first direction and linearly polarized light in the second direction, which are included in incident light on said plurality of anisotropic cells, thereby making a first light intensity distribution formed on the predetermined plane by the linearly polarized light in the first direction included in the incident light different from a second light intensity distribution formed on the predetermined plane by the linearly polarized light in the second direction included in the incident light,
said second anisotropic cell has a thickness larger than a thickness of said first anisotropic cell by $\alpha$,
said fourth anisotropic cell has a thickness larger than a thickness of said third anisotropic cell by $\alpha$,
said third anisotropic cell has the thickness larger than the thickness of said first anisotropic cell by $\beta$, and
said plurality of anisotropic cells satisfy:

$$0.75 \times (\lambda/N)/\{(n_1+n_2)/2-n_a\} < \alpha < 1.25 \times (\lambda/N)/\{(n_1+n_2)/2-n_a\}.$$

$$0.75 \times (\lambda/N)/|n_1-n_2| < \beta < 1.25 \times (\lambda/N)/|n_1-n_2|, \text{ and}$$

$$i \times N/2 + 0.25 < \beta/\alpha < i \times N/2 + 0.75$$

where $\lambda$ is a wavelength of the incident light on said plurality of anisotropic cells; $n_1$ is the refractive index of said plurality of anisotropic cells with respect to the linearly polarized light in the first direction; $n_2$ is the refractive index of said plurality of anisotropic cells with respect to the linearly polarized light in the second direction; $n_a$ is a refractive index of an atmosphere; N is the number of phase levels of a phase distribution according to which the phases of the linearly polarized light in the first direction and the linearly polarized light in the second direction, which are included in the incident light, are changed; and i is an integer not less than 2.

* * * * *